(12) United States Patent
Kobayashi et al.

(10) Patent No.: US 7,771,064 B2
(45) Date of Patent: Aug. 10, 2010

(54) SIDE MIRROR OF MOTORCYCLE AND MOTORCYCLE THEREWITH

(75) Inventors: Yuta Kobayashi, Iwata (JP); Kuniyuki Takahashi, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 12/258,825

(22) Filed: Oct. 27, 2008

(65) Prior Publication Data

US 2009/0141377 A1 Jun. 4, 2009

(30) Foreign Application Priority Data

Oct. 31, 2007 (JP) .............................. 2007-284223

(51) Int. Cl.
*G02B 5/08* (2006.01)
*G02B 7/182* (2006.01)
*B60J 1/20* (2006.01)
*B62D 55/00* (2006.01)

(52) U.S. Cl. ...................... 359/841; 359/842; 296/95.1; 180/9.25

(58) Field of Classification Search ................. 359/841, 359/842, 872; 296/84.1, 96, 95.1; 180/9.25
See application file for complete search history.

(56) References Cited

U.S. PATENT DOCUMENTS 4,142,758 A * 3/1979 Scaife .......................... 296/91
4,715,681 A * 12/1987 Johnson ....................... 359/526
4,759,620 A * 7/1988 Sakuma et al. .............. 359/841
4,906,086 A * 3/1990 Imai et al. ................... 359/844
6,036,160 A * 3/2000 Shimokobe et al. ......... 248/483
6,485,151 B2 * 11/2002 Coleburn ..................... 359/842
7,007,998 B2 * 3/2006 Toyofuku ................... 296/78.1
7,048,420 B2 * 5/2006 Arakawa ..................... 362/494
7,325,853 B2 * 2/2008 Tsukui et al. .............. 296/78.1
2005/0237634 A1* 10/2005 Rothmann ................... 359/871
2008/0062544 A1* 3/2008 Kitajima et al. ............. 359/872
2008/0080074 A1* 4/2008 Sakamoto .................... 359/842
2009/0127884 A1* 5/2009 Takahashi et al. ............. 296/96

FOREIGN PATENT DOCUMENTS

| JP | 58-049538 | * | 3/1983 |
| JP | 2001-071964 | | 3/2001 |
| JP | 2002-29479 | * | 1/2002 |
| JP | 2006-69299 | * | 3/2006 |

* cited by examiner

*Primary Examiner*—Ricky D Shafer
(74) *Attorney, Agent, or Firm*—Keating & Bennett, LLP

(57) ABSTRACT

A side mirror includes a mount seat mounted to a front cowl that covers a portion of the front of a vehicle body, a mirror stay supported on the mount seat with a basal end thereof supported in a turnable manner, and a mirror provided at a tip end of the mirror stay. The mount seat includes a base portion 41*a* extended in one direction and mounted to the front cowl, and a support portion provided on the base portion 41*a* to support the basal end of the mirror stay so that a direction Dp in which a turning shaft of the mirror stay extends is inclined to a length direction DL of the base portion. With this structure, a side mirror increased in degree of freedom in selecting a mount position on a front cowl can be provided.

8 Claims, 15 Drawing Sheets

SIDE MIRROR OF MOTORCYCLE AND MOTORCYCLE THEREWITH

This application claims priority under 35 U.S.C. §119 to Japanese Patent Applications No. 2007-284223 filed on Oct. 31, 2007, the entire disclosure of which is incorporated herein by reference in its entirety.

BACKGROUND OF THE INVENTION

1. Field of the Invention

The preferred embodiments of the present invention relate, inter alia, to the structure of a side mirror provided on a motorcycle and a motorcycle equipped with the side mirror.

2. Description of the Related Art

The following description sets forth the inventor's knowledge of related art and problems therein and should not be construed as an admission of knowledge in the prior art.

It is desired that side mirrors of a motorcycle can be adjusted in level or height according to a rider's body height and posture and also can be folded toward the vehicle widthwise center as need arises. In some conventional side mirrors, a basal end of a rod-shaped mirror stay with a mirror mounted on the tip end of the stay is turnably supported by a mount seat mounted on a cowl (see, for example, Japanese Unexamined Laid-open Patent Publication No. 2001-71964). Usually, such mount seat that supports a side mirror is formed into a shape extending in one direction. The mount sheet is provided with bolts for fixing the mount sheet to a front cowl at both ends of the mount seat and a support portion located between the bolts for turnably supporting the basal end of the mirror stay. Also, in order to assuredly support a mirror and a mirror stay by a mount seat, a turning shaft of the mirror stay is generally provided perpendicularly to the extension direction (length direction) of the mount seat. With such structure, a rider can adjust the level or height of the mirror or fold the mirror by turning the mirror stay about the shaft.

In order to prevent the interference between the movable ranges of a mirror stay and a mirror and the positions of vehicle body parts, it is necessary to carefully select the mounting position of the mount seat on the front cowl. However, according to the related art, the turning shaft of the mirror stay is provided perpendicularly to a length direction of the mount seat, resulting in a small degree of freedom in selecting the mounting position. This sometimes requires redesign of the shape, etc., of the front cowl.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a side mirror increased in degree of freedom in selecting a mount position of the side mirror on a front cowl of a vehicle, and a motorcycle provided with the side mirror.

According to a first aspect of a preferred embodiment of the present invention, a side mirror of a motorcycle includes a mount seat mounted to a front cowl that covers a portion of a front of a vehicle body, a mirror stay having a basal end supported by the mount seat in a turnable manner, and a mirror provided at a tip end of the mirror stay. The mount seat includes a base portion extended in one direction and mounted to the front cowl, and a support portion provided on the base portion to support the basal end of the mirror stay so that a direction in which a turning shaft of the mirror stay extends is inclined to a length direction of the base portion.

In the aforementioned side mirror, the direction in which the turning shaft of the mirror stay extends is not constrained with respect to the length direction of the base portion of the mount seat, which increases the degree of freedom in selecting a mount position of the mount seat on a cowl of the vehicle.

According to a second aspect of a preferred embodiment of the present invention, a motorcycle is equipped with the aforementioned side mirror. In this motorcycle, the same effects mentioned above can be obtained.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
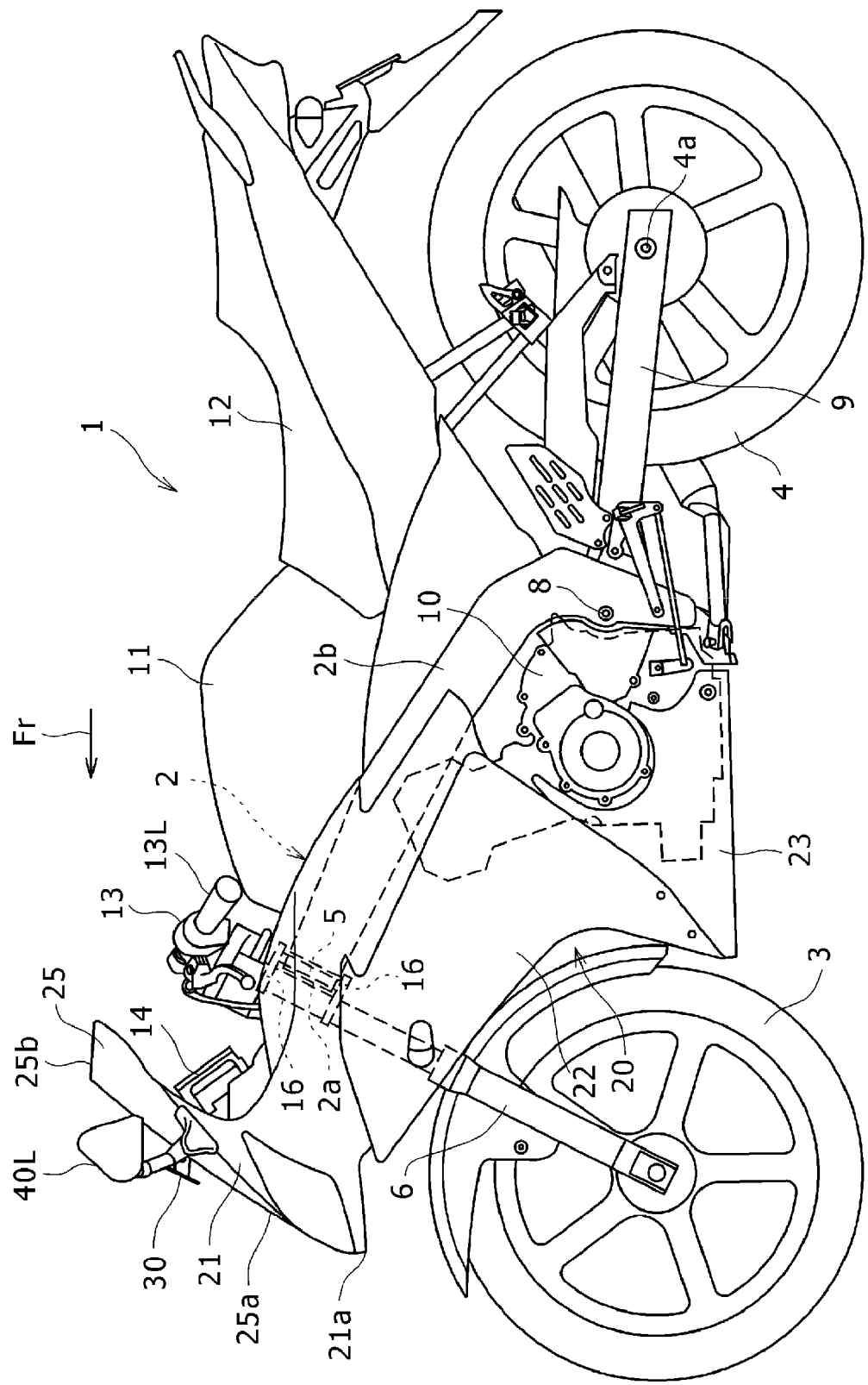
FIG. 1 is a side view showing a motorcycle according to an embodiment of the invention.
Figure 2:
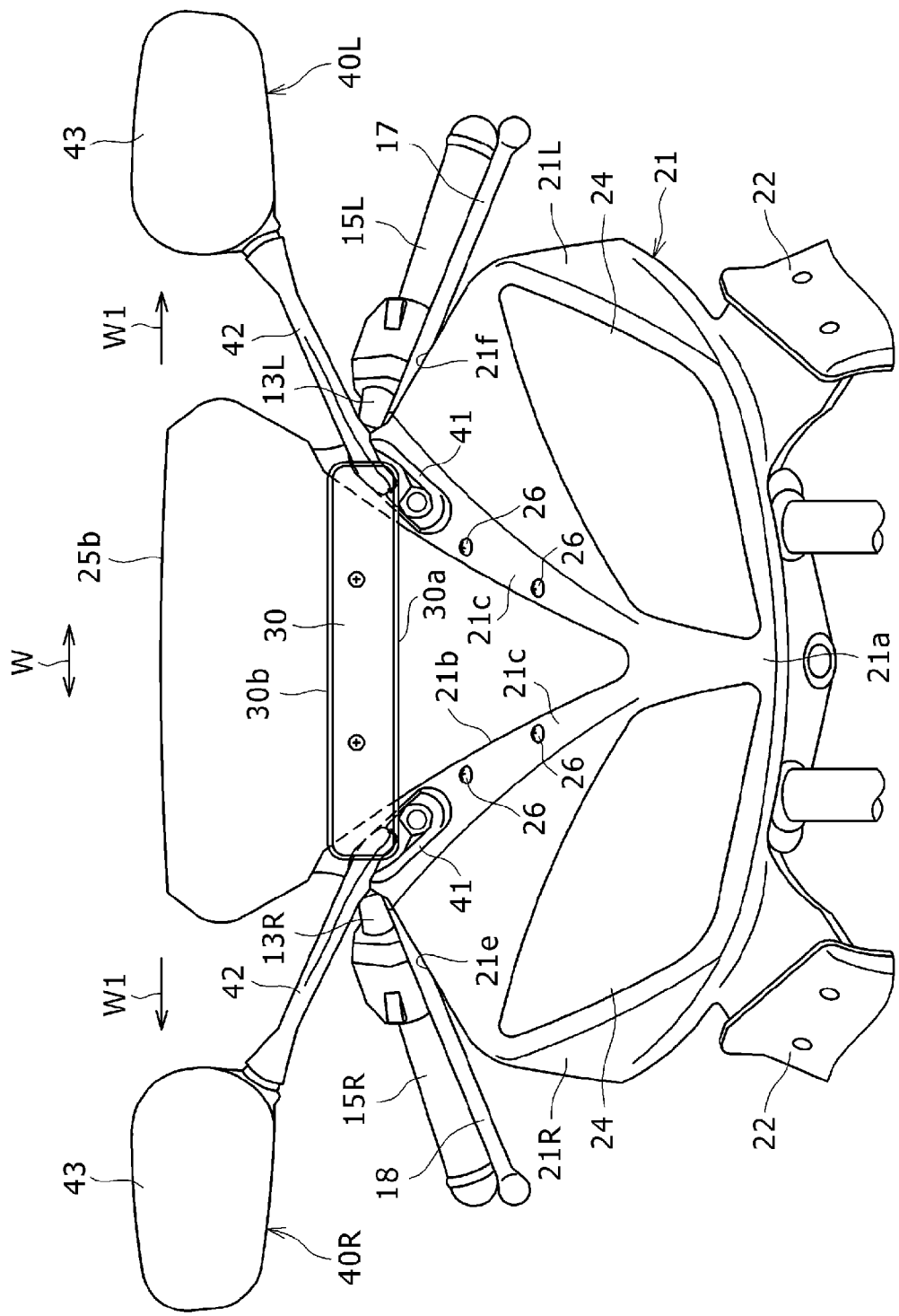
FIG. 2 is a front view showing an upper portion of the motorcycle.
Figure 3:
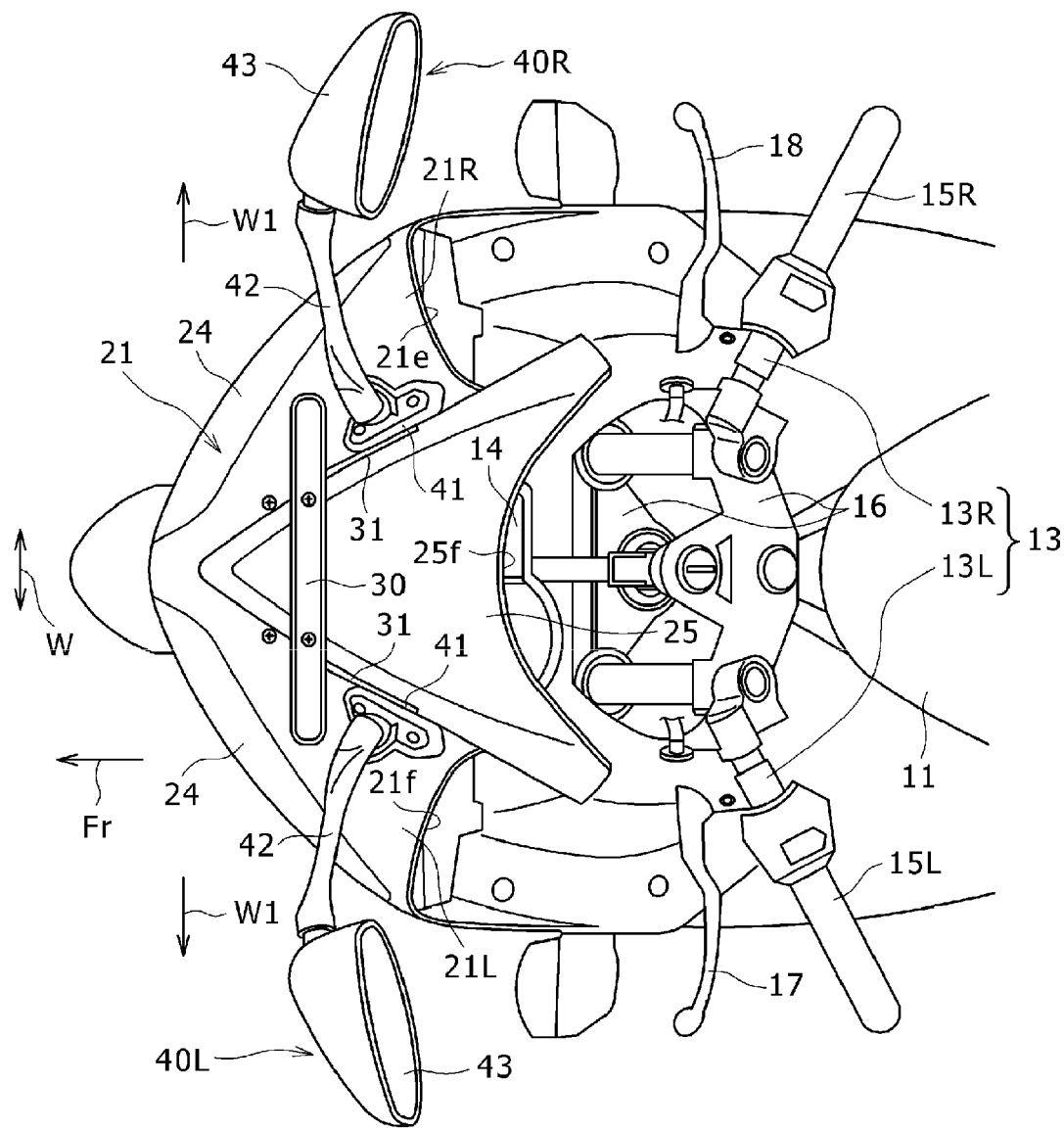
FIG. 3 is a top view showing a front portion of the motorcycle.
Figure 4:
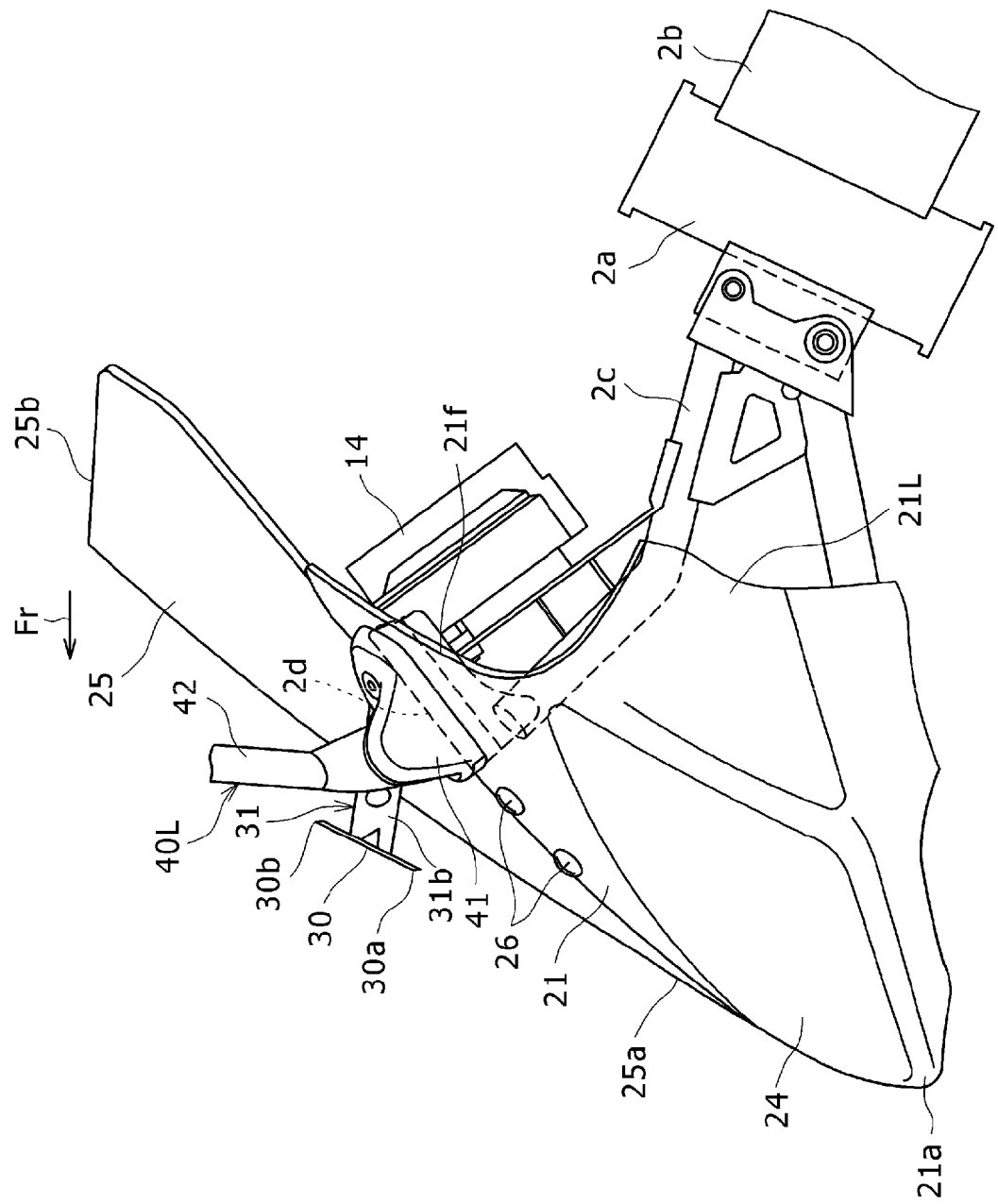
FIG. 4 is a side view showing the front portion of the motorcycle to which a left side mirror is mounted.
Figure 5:
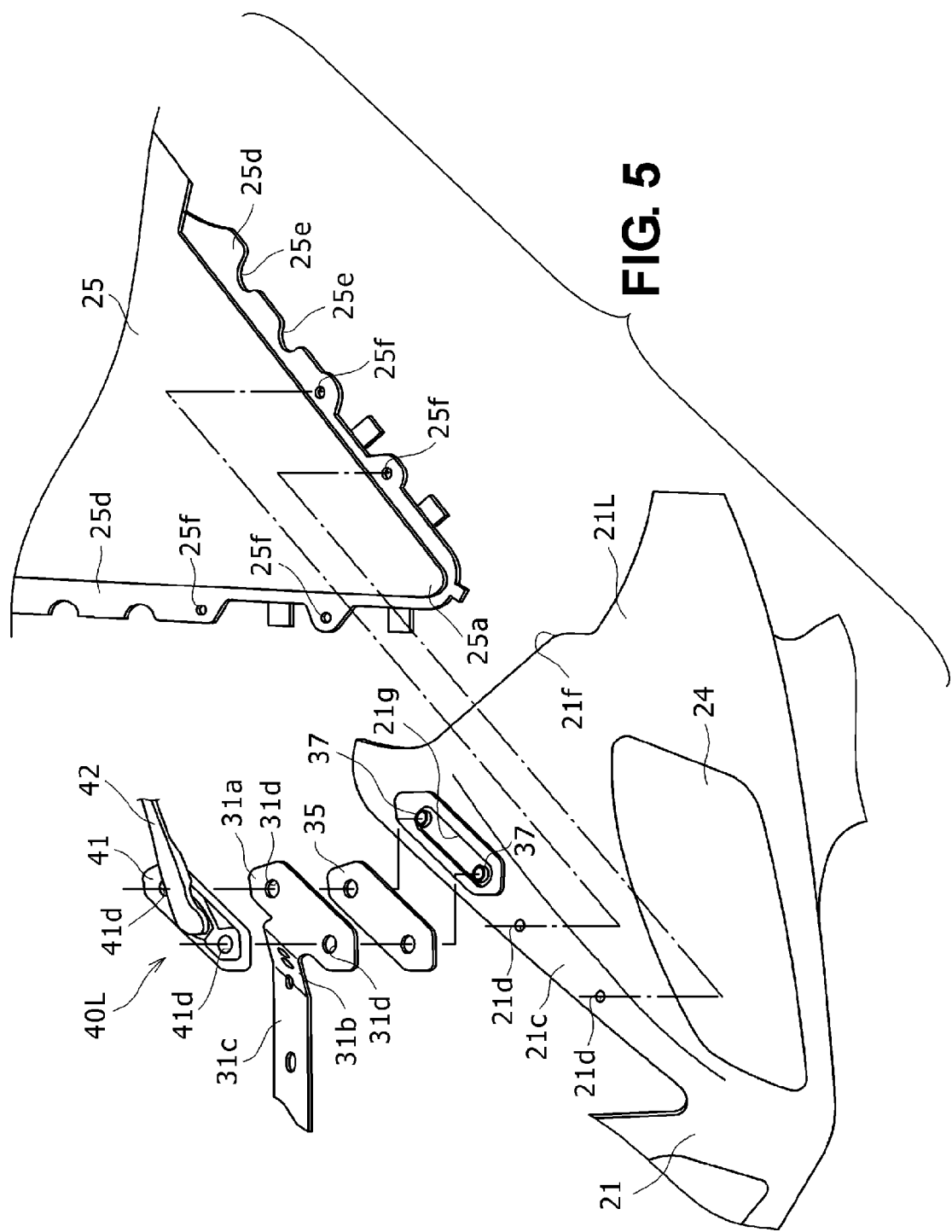
FIG. 5 is an exploded perspective view showing a stay that supports a side mirror, a screen, and a rectifier plate.

Hereinafter, an embodiment of the invention will be described with reference to the attached drawings. FIG. 1 is a side view showing a motorcycle 1 provided with side mirrors 40L and 40R according to an embodiment of the present invention. FIG. 2 is a front view showing an upper portion of the motorcycle 1. FIG. 3 is a top view showing a front portion of the motorcycle 1. FIG. 4 is a side view showing a left side portion of the motorcycle 1 to which the left side mirror 40L is mounted. FIG. 5 is an exploded perspective view showing a screen 25, the side mirror 4, etc.

As shown in FIGS. 1 and 2, the motorcycle 1 includes a frame 2, a cowl 20, a screen 25, side mirrors 40R and 40L, an engine 10, a front wheel 3, and a rear wheel 4.

As shown in FIG. 1, a steering shaft 5 extending obliquely upward is arranged at the front portion of the motorcycle 1. The steering shaft 5 is mounted to an obliquely upwardly extending front fork 6 through two brackets 16 and 16 aligned up and down. An axle shaft of the front wheel 3 is supported by the lower end of the front fork 6.

The steering shaft 5 is supported rotatably by a head pipe 2a provided at the front end of the frame 2. A main frame 2b extends obliquely downward toward the rear of a vehicle body from the head pipe 2a. The engine 10 is arranged below the main frame 2b. The engine 10 is suspended by the main frame 2b. A pivot shaft 8 supported by the main frame 2b is arranged rearwardly of the engine 10. A front end of a rear arm 9 is connected to the pivot shaft 8 and a rear end of the rear arm 9 supports an axle shaft 4a of the rear wheel 4. A driving force outputted from the engine 10 is transmitted to the rear wheel 4 through a chain (not shown).

A fuel tank 11, for storing a fuel being consumed by the engine 10, is arranged above the main frame 2b. A seat 12, on which a rider is seated, is arranged rearwardly of the fuel tank 11.

A handle 13 for changing the direction of the front wheel 3 according to the operation by the rider is arranged forwardly of the fuel tank 11. In this embodiment, grips 15L and 15R grasped by a rider are arranged at both right and left ends of the handle 13 (see FIG. 2). As shown in FIG. 3, in this embodiment, the handle 13 is a separate type handle including a left bar 13L and a right bar 13R separated from each other, the grip 15L is provided on the left bar 13L, and the grip 15R is provided on the right bar 13R. A lever 17 (for example, a clutch lever) and a lever 18 (for example, a brake lever), which are operated by a rider, are arranged forwardly of the grips 15L and 15R. The left bar 13L and the right bar 13R, respectively, are connected to an upper portion of the steering shaft 5 through the upper bracket 16 (see FIG. 1) to turn left and right together with the steering shaft 5, the front fork 6, and the front wheel 3. A meter 14 including a speed meter representative of the traveling speed of the motorcycle 1, a tachometer representative of the rotating speed of the engine 10, etc., is arranged forwardly of the handle 13.

This motorcycle 1 is a so-called full cowl type vehicle. The cowl 20 includes a front cowl 21, side cowls 22, and an under cowl 23 as shown in FIG. 1.

The under cowl 23 is arranged forwardly of the engine 10 so as to cover a front side of the engine 10. The side cowls 22 are provided so as to extend obliquely upward from the front of the engine 10 toward the front of the vehicle body as viewed from the lateral side of the vehicle and cover both left and right sides of the front of the vehicle body. It should be noted that FIG. 1 depicts only the cowl 22 on the left (hereinafter referred to as "left") in a vehicle traveling direction (e.g., the direction indicated by the arrow Fr).

The front cowl 21 is one that covers the front of the vehicle body, and is positioned upwardly of the front wheel 3 and forwardly of the meter 14. The front cowl 21 is extended obliquely upward toward the rear of the vehicle body from the lower edge (front edge) 21a thereof. Also, the front cowl 21 is curved so that its vehicle widthwise center portion projects forward. Also, as shown in FIG. 2, the front cowl 21 is formed into a substantially V-shape opened upward as viewed from the front and formed with a triangular-shaped cutout 21b at a center thereof.

The right portion 21R of the front cowl 21 positioned on the right side of the cutout 21b (hereinafter referred to as "right side") with respect to the vehicle traveling direction and the left portion 21L of the front cowl 21 positioned on the left side of the cutout 21b (hereinafter referred to as "left side") with respect to the vehicle traveling direction, respectively, are located below the side mirrors 40R and 40L and below the grips 15R and 15L and extended rearward to reach the fuel tank 11 (see FIGS. 1 and 2). As shown in FIG. 2, the levers 17 and 18, respectively, are positioned rearwardly of the upper edge 21e of the right portion 21R and the upper edge 21f of the left portion 21L. Headlight covers 24 and 24, respectively, are mounted to the right portion 21R and the left portion 21L. Headlights (not shown) are arranged at the back (rear side) of the headlight covers 24 and inwardly of the front cowl 21.

As shown in FIGS. 1 and 2, the screen 25 is positioned forwardly of the handle 13 and positioned at the vehicle widthwise center portion (the widthwise direction is indicated by the arrow W). As shown in FIG. 5, the screen 25 is formed into a substantially triangular-shape corresponding to the shape of the cutout 21b of the front cowl 21. The edge portion 25d thereof is provided with mount holes 25f and 25f. The screen 25 is mounted to the front cowl 21 from the back side of the front cowl 21 by fixing the screen 25 to the front cowl 21 with bolts 26 and 26 inserted into the aligned mount holes 25f and 25f and 21d and 21d.

As shown in FIGS. 2 and 4, the screen 25 extends obliquely upward from the lower end 25a thereof, and the upper edge 25b thereof reaches a position above the upper edge 21e of the right portion 21R, the upper edge 21f of the left portion 21L, the handle 13 and the meter 14. As described later, the side mirrors 40L and 40R are configured to be folded rearward so as to be positioned outwardly of the upper edge 25b of the screen 25 in a vehicle width direction (e.g., the direction indicated by the arrow W1) in the folded state.

A rectifier plate 30 is provided forwardly of the front cowl 21 to rectify a travel wind. In this embodiment, as shown in FIGS. 2 and 4, the rectifier plate 30 is a plate-shaped member extended in the vehicle width direction and positioned forwardly of the screen 25. The rectifier plate 30 rectifies a travel wind in front of the screen 25 to prevent the travel wind from hitting directly against the screen 25. Thereby, dust, insects, etc., which comes on the travel wind to fly, are prevented from adhering to the screen 25.

As shown in FIG. 4, the rectifier plate 30 extends obliquely upward along the surface of the screen 25 from the lower edge 30a thereof in front of the screen board 25. The rectifier plate 30 is positioned forwardly of the vehicle heightwise center portion of the screen 25 and supported in a position away from the surface of the screen 25. Also, the heightwise length of the rectifier plate 30 is shorter than the heightwise length of the screen 25 and positioned between the upper edge (rear end) 25b and the lower end (front end) 25a of the screen 25 in a longitudinal direction of the vehicle. A stay 31 is arranged on a back surface side of the rectifier plate 30, and the rectifier plate 30 is supported in front of the screen 25 by the stay 31. As shown in FIG. 2, the side mirrors 40R and 40L are arranged on both right and left sides of the rectifier plate 30, and the stay 31 of the rectifier plate 30, together with the side mirrors 40R and 40L, is fixed to a stay 2c extended forwardly of the head pipe 2a (see FIGS. 4 and 5).

In addition, as shown in FIG. 5, the stay 31 includes bases 31a mounted to the edge portions 21c of the front cowl 21, extensions 31b extended forward from the bases 31a, and a mount plate portion 31c extended from tip ends of the extensions 31b in the vehicle width direction. The rectifier plate 30 is mounted to the mount plate portion 31c.

Figure 6:
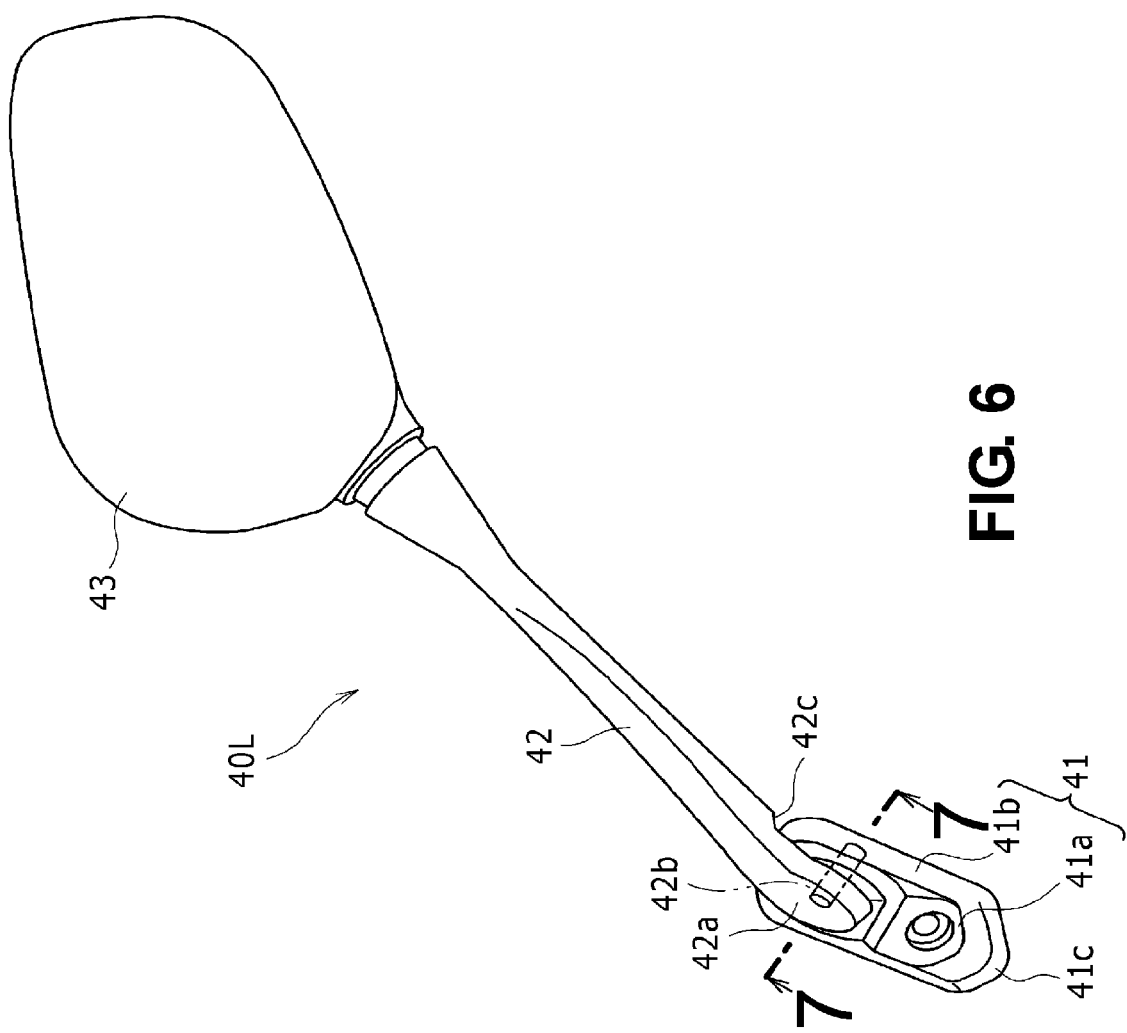
FIG. 6 is a front view showing the side mirror.
Figure 7:
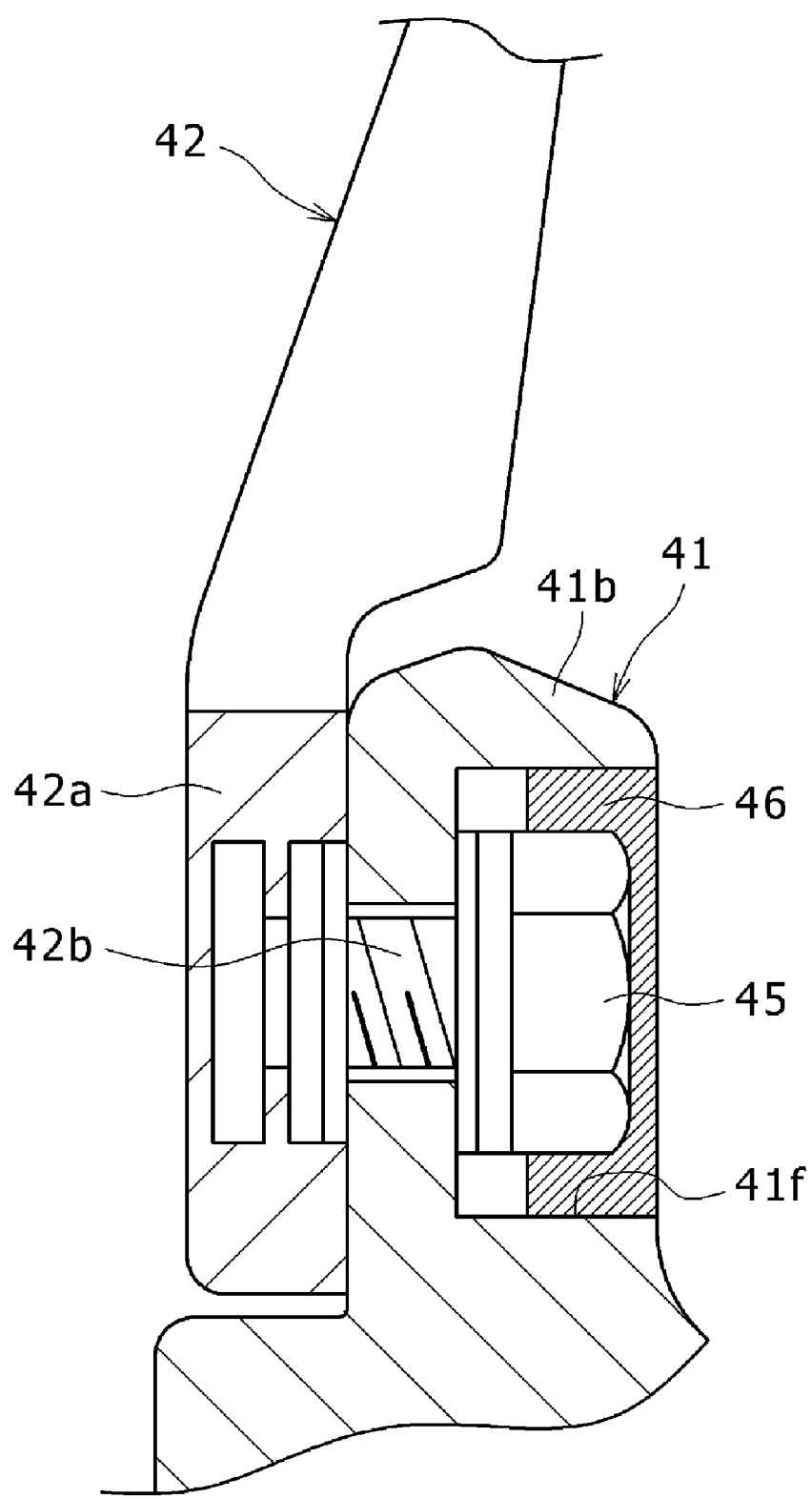
FIG. 7 is a cross-sectional view taken along the line 7-7 in FIG. 6.
Figure 8:
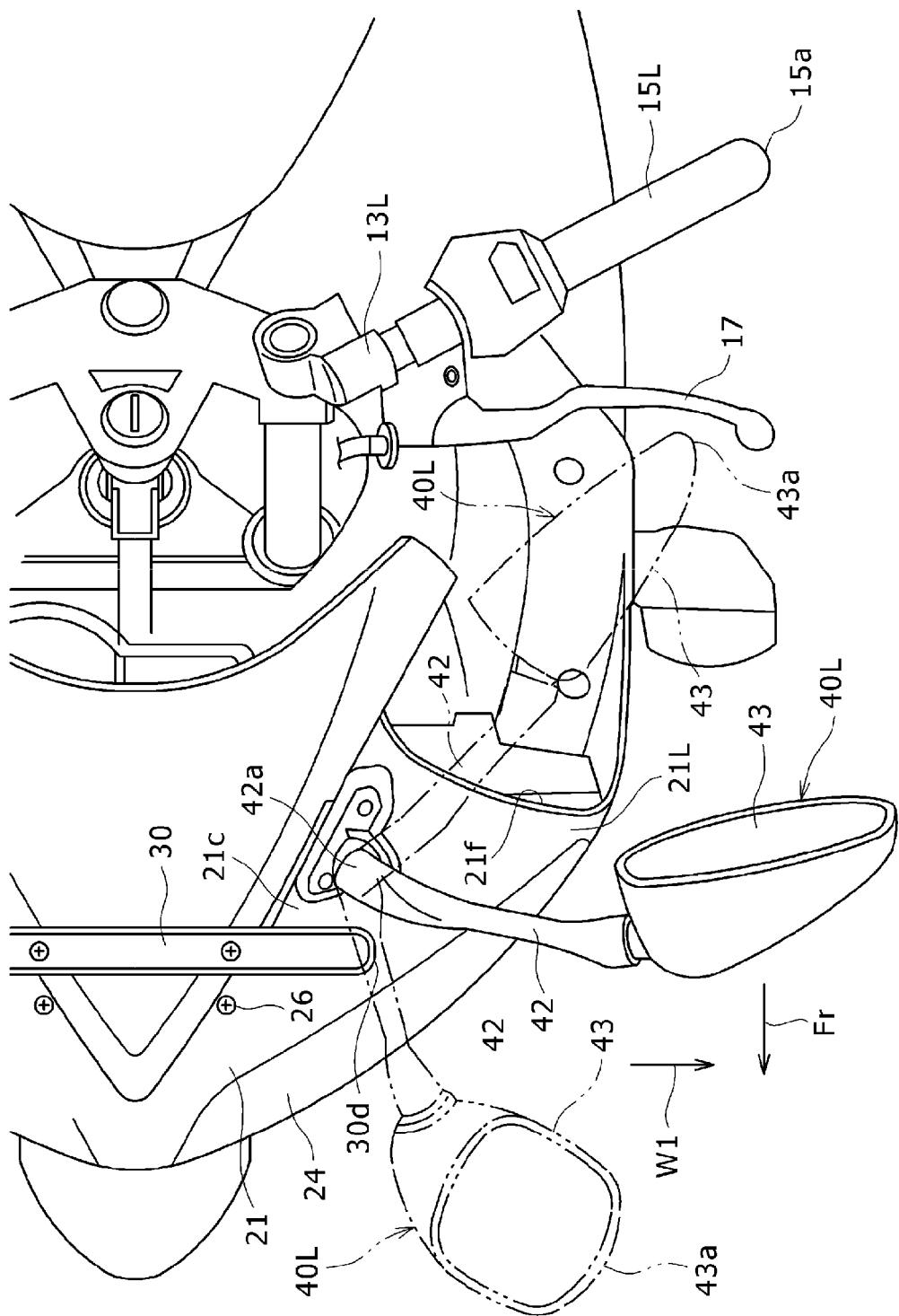
FIG. 8 is a top view showing the side mirror mounted to a vehicle body.
Figure 9:
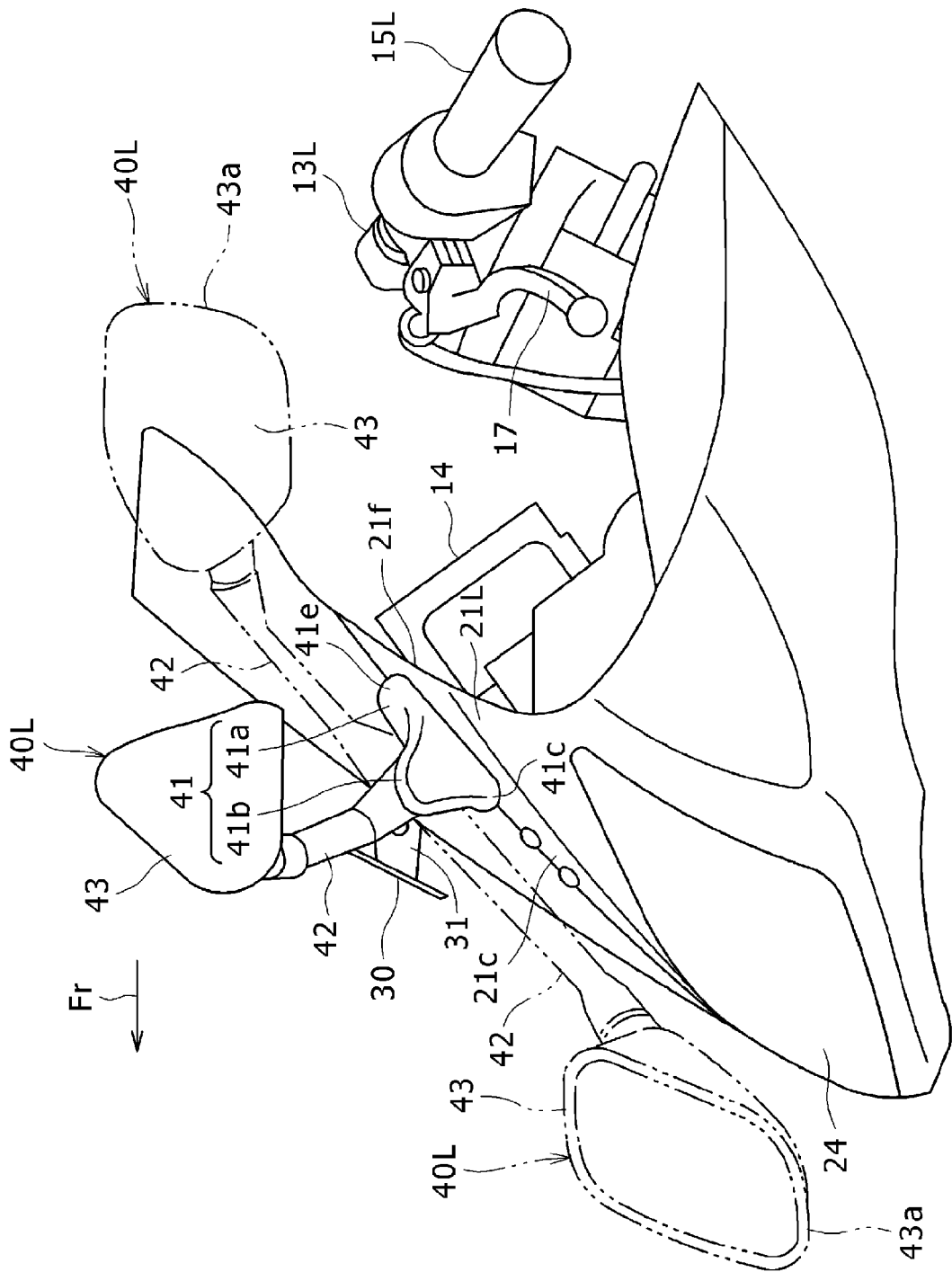
FIG. 9 is a side view showing the side mirror mounted to the vehicle body.
Figure 10:
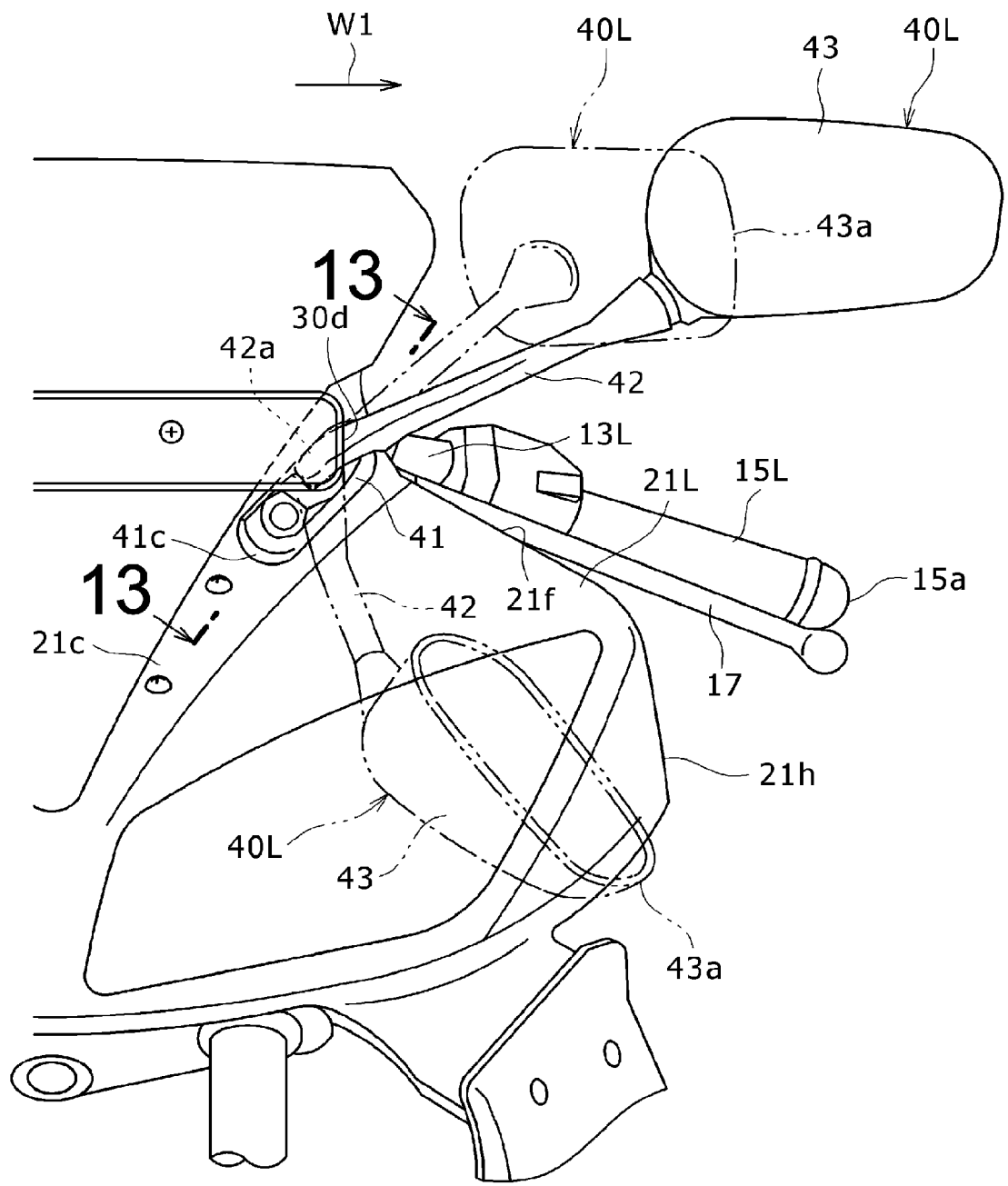
FIG. 10 is a partial front view showing the side mirror mounted to the vehicle body.

Now, the following explanation will be directed to the side mirrors 40R and 40L. The side mirrors 40R and 40L are used for a rider to see the rear view of the vehicle and provided right and left at the front side of the vehicle. The side mirrors 40R and 40L are bilateral symmetric in structure and therefore the following explanation will be directed to the side mirror 40L located at the left side with respect to the vehicle traveling direction. FIG. 6 is a front view showing the side mirror 40L, and FIG. 7 is a cross-sectional view taken along the line 7-7 in FIG. 6. FIGS. 8 to 10 show the side mirror 40L in a state in which the mirror is mounted to the vehicle body. FIG. 8 is a top view showing the side mirror 40L, and FIG. 9 is a side view showing the side mirror 40L. FIG. 10 is a front view showing the side mirror 40L. It should be noted that, in FIGS. 8 to 10, the side mirror 40L in a use position (i.e., in a position when a rider sees the rear view using the side mirror 40L) is depicted by solid lines and the side mirror 40L in a folded position folded forward or rearward is shown by two-dot chain lines.

As shown in FIG. 6, the side mirror 40L includes a mount seat 41 mounted to the front cowl 21, a mirror stay 42 supported on the mount seat 41, and a mirror 43 provided at the tip end of the mirror stay 42. A turning shaft 42b is provided at the basal end 42a of the mirror stay 42. The basal end 42a is supported by the mount seat 41 so that the mirror stay 42 can turn about the turning shaft 42b. As shown in FIG. 7, in this embodiment, the turning shaft 42b is a bolt embedded in the basal end 42a of the mirror stay 42. The end of the bolt is screwed in a nut 45 provided at the support portion 41b of the mount seat 41, so that the basal end 42a of the mirror stay 42 is mounted to the support portion 41b. The nut 45 is disposed in a recess 41f formed in the support portion 41b and covered by a cap 46 from outside.

As shown in FIG. 8, the mount seat 41 is mounted to the edge portion 21c of the front cowl 21 with the length direction of the mount seat 41 extending in the extension direction of the edge portion 21c. Also, the mount seat 41 is positioned at around the lengthwise center portion of the screen 25 (see FIG. 4) as viewed from the lateral side and positioned at a portion deviated outwardly of the vehicle widthwise center portion toward the left side (in the direction indicated by the arrow W1 in FIG. 10) in top view. When in use, the side mirror 40L is positioned so that it extends in the vehicle widthwise direction (see FIG. 10). At this time, the side mirror 40L is positioned forwardly of the grip 15L (see FIGS. 8 and 9).

Figure 11:
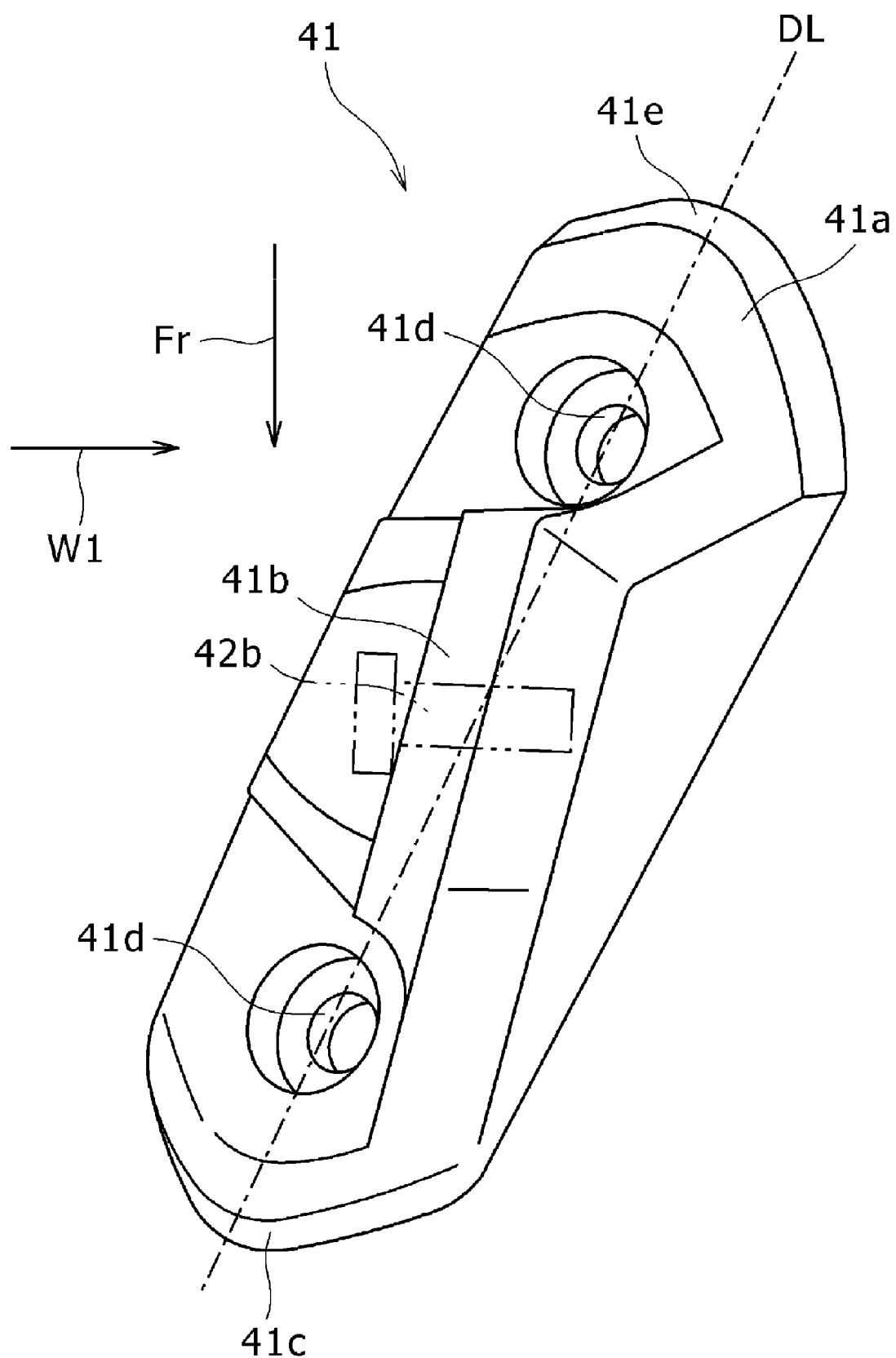
FIG. 11 is a top view showing a mount seat to which the side mirror is mounted.
Figure 12:
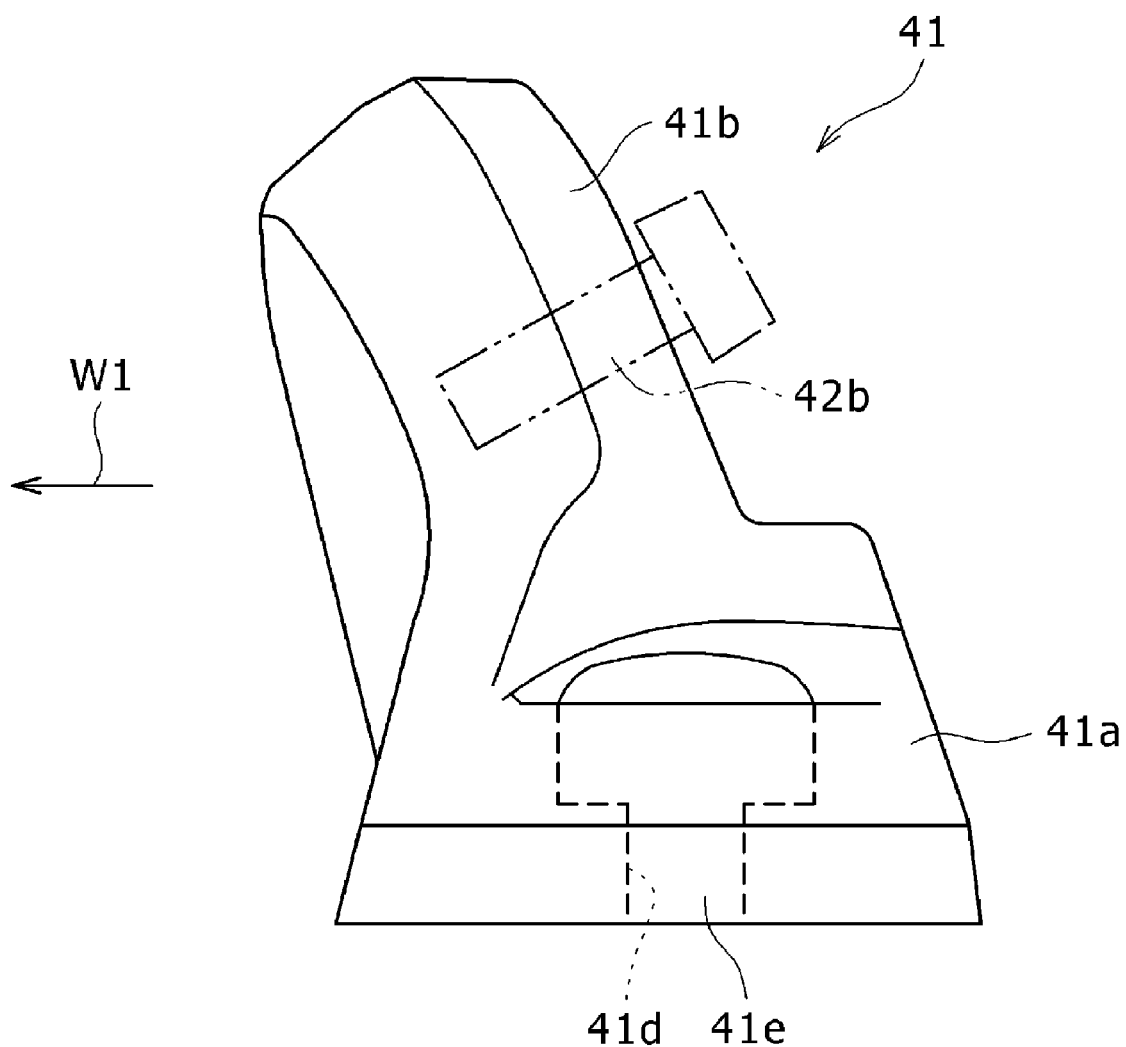
FIG. 12 is a rear view showing the mount seat.
Figure 13:
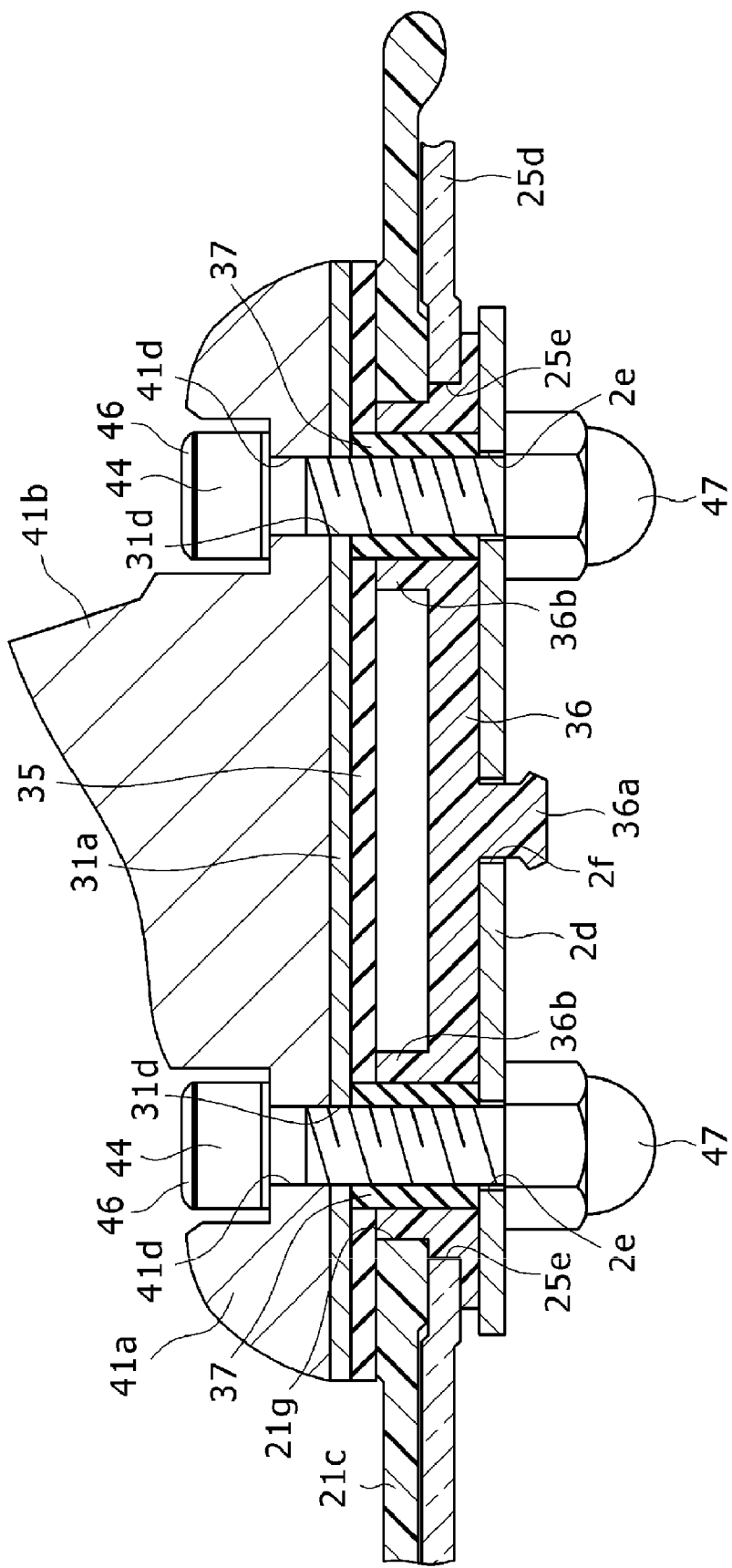
FIG. 13 is a cross-sectional view taken along the line 13-13 in FIG. 10.

FIG. 11 is a top view showing the mount seat 41. FIG. 12 is a view showing the mount seat 41 as viewed from the rear, and FIG. 13 is an enlarged cross-sectional view taken along the line 13-13 in FIG. 10. As shown in the figures, the mount seat 41 includes a base portion 41a extending in one direction. The base portion 41a is mounted to the edge portion 21c of the front cowl 21. The mount seat 41 includes the support portion 41b on the base portion 41a. The support portion 41b supports the basal end 42a of the mirror stay 42 so that the mirror stay 42 can turn about the turning shaft 42b.

In a state in which the base portion 41a is mounted to the front cowl 21, the length direction thereof (e.g., the direction indicated by the line DL in FIG. 11) is oriented substantially in the longitudinal direction of the vehicle (see FIG. 8). As shown in FIG. 11, two mount holes 41d and 41d aligned in a direction in which the base portion 41a is extended are formed at the front and rear portions of the base portion 41a, and bolts 44 and 44 are inserted through the mount holes 41d and 41d to fix the mount seat 41 to the edge portion 21c of the front cowl 21 (see FIG. 13).

The base portion 41a is mounted to the front cowl 21 in an inclined posture so that its rear end 41e is positioned outwardly (e.g., the direction indicated by the arrow W1) of the front end 41c in the vehicle width direction (see FIG. 11). Also, as shown in FIG. 9, the base portion 41a is mounted to the front cowl 21 in an inclined posture so that its rear end 41e is positioned to be higher than the front end 41c.

As shown in FIGS. 11 and 12, the support portion 41b is positioned between the mount holes 41d and 41d formed in the base portion 41a so as to rise upward from the base portion 41a. As shown in FIG. 12, the turning shaft 42b is provided so as to extend in the widthwise direction of the support portion 41b. The mirror stay 42 moves forwardly or rearwardly of the vehicle body following an arcuate path perpendicular to the turning shaft 42b.

Figure 14:
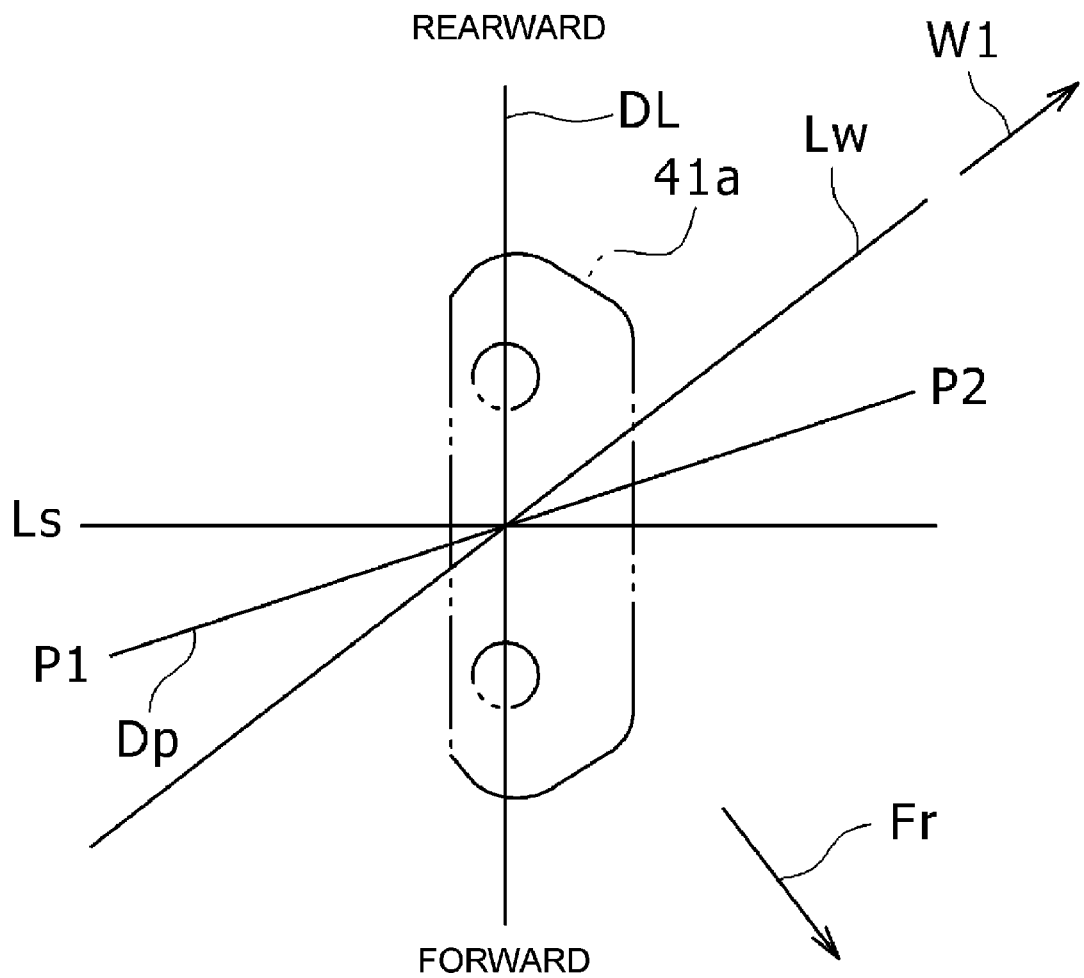
FIG. 14 is a view showing a direction in which a turning shaft of the side mirror extends.
Figure 15:
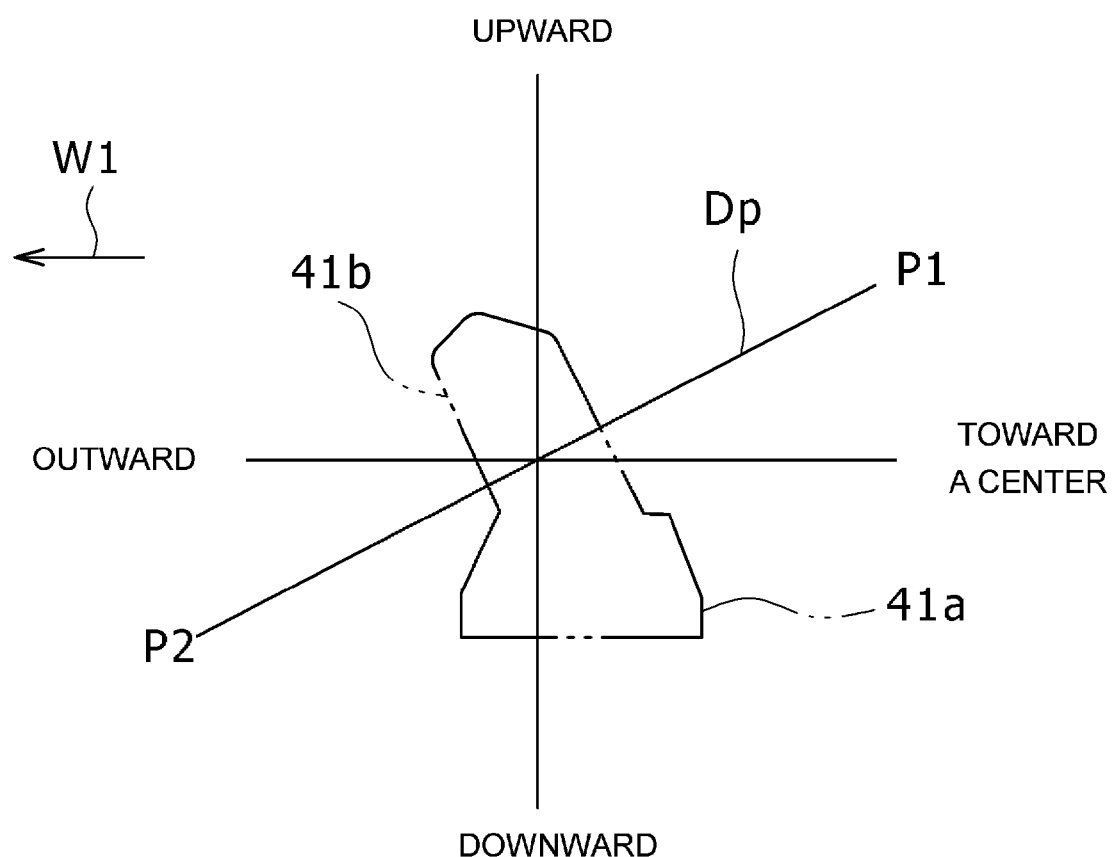
FIG. 15 is a view showing a direction in which the turning shaft of the side mirror extends.

The following detailed explanation will be directed to the extension direction of the turning shaft 42b. FIGS. 14 and 15 are views illustrating the extension direction of the turning shaft 42b. FIG. 14 shows a direction Dp in which the turning shaft 42b extends when the base portion 41a is seen from a direction perpendicular to the surface of the front cowl 21 to which the base portion 41a is mounted. FIG. 15 shows a direction Dp in which the turning shaft 42b extends when the mount seat 41 is seen from the length direction DL thereof.

As shown in FIG. 14, the support portion 41b supports the basal end 42a of the mirror stay 42 so that a direction Dp in which the turning shaft 42b of the mirror stay 42 extends is inclined to the length direction DL of the base portion 41a. In this embodiment, the turning shaft 42b is provided so as to extend from a position P1 deviated toward the vehicle widthwise center position and forwardly of the length direction DL of the base portion 41a to a position P2 deviated outwardly of the vehicle widthwise center direction and rearwardly of the length direction DL. In addition, in FIG. 14, the position P1 representative of the direction Dp in which the turning shaft 42b extends is a position located forwardly of a straight line Ls passing through the center of the turning shaft 42b in the short length direction. On the other hand, the position P2 representative of the direction Dp in which the turning shaft 42b extends is a position located rearwardly of the straight line Ls. Also, the position P1 is located rearwardly of a vehicle width direction straight line Lw passing through the center of the turning shaft 42b and the position P2 is located forwardly of the straight line Lw. Also, as shown in FIG. 15, a direction Dp in which the turning shaft 42b extends is inclined obliquely downward from the position P1 deviated toward the vehicle widthwise center position to the outward position P2. That is, the turning shaft 42b is provided so that the position P1 deviated toward the vehicle widthwise center position is higher than the position P2 disposed outward.

Next, the following explanation will be directed to the movable range of the mirror stay 42. As shown in FIG. 9, the mirror stay 42 can be folded forward about the turning shaft 42b from the use position in which the extension direction is oriented in the vehicle width direction to the position in which the mirror 43 is positioned lower than the upper edge 21f of the left portion 21L of the front cowl 21. At this time, the mirror stay 42 passes the vehicle widthwise lateral side of the edge 30d of the rectifier plate 30 so as to avoid the interference between the mirror stay 42 and the rectifier plate 30 (see FIGS. 8 and 10). Also, as shown in FIG. 10, in a state in which the mirror stay 42 is folded forward, the tip end 43a of the mirror 43 is positioned inwardly of the edge 21h of the front cowl 21 in the vehicle width direction toward the vehicle widthwise center position (toward a direction opposite to the direction indicated by the arrow W1). As shown in FIG. 9, the mirror stay 42 extends in a direction along the front cowl 21. The mirror stay 42 is provided with a stopper 42c so that turning of the mirror stay 42 is stopped in such position (see FIG. 6).

Also, the mirror stay 42 can be moved rearward from the use position described above. In a state in which the mirror stay 42 is folded rearward, the mirror 43 is positioned rearwardly of the upper edge 21f of the left portion 21L of the front cowl 21 (see FIG. 8) and the end 43a of the mirror 43 located outward in the vehicle width direction is positioned inwardly of the end 15a of the grip 15L in the vehicle width direction (see FIG. 10).

Finally, the mount structure of the stay 31 that supports the side mirror 40L and the rectifier plate 30 will be explained. As shown in FIG. 5, the base 31a of the stay 31 is provided with two mount holes 31d and 31d aligned in the longitudinal direction. Also, as described above, the base portion 41a of the side mirror 40L is provided with the two mount holes 41d and 41d aligned in the longitudinal direction (see FIG. 11). Also, as shown in FIG. 4, the stay 2c extended forward is mounted to the head pipe 2a and a bracket 2d is provided at the tip end of the stay 2c. Also, as shown in FIG. 13, this bracket 2d is provided with two mount holes 2e and 2e aligned longitudinally. Also, as shown in FIG. 5, an elongated slot 21g extended in the longitudinal direction is formed in the edge portion 21c of the front cowl 21 and the mount holes 31d and 31d, the mount holes 40d and 40d, and the mount holes 2e and 2e are positioned inside the slot 21g. As shown in FIG. 13, the bolts 44 and 44 are inserted through the mount holes 31d and 31d formed in the base 31a of the stay 31, the mount holes 41d and 41d of the side mirror 40L, and the mount holes 2e and 2e of the bracket 2d, and nuts 47 and 47 are clamped to the bolts 44 and 44 from a back side of the bracket 2d. In this manner, the side mirror 40L and the stay 31 are fixed to the body frame 2 and the front cowl 21 by the common bolts 44 and 44.

As shown in FIG. 5, substantially semi-circular cuts 25e and 25e are formed at the edges 25d of the screen 25 so as to be positioned correspondingly to the bolts 44 and 44. As shown in FIG. 13, edges of the cuts 25e are interposed between the bracket 2d of the stay 2c and edges of the slot 21g of the front cowl 21.

Also, as shown in FIGS. 5 and 13, a thin cushioning member 35 formed from, for example, rubber is interposed between the base 31a of the stay 31 and the edge portion 21c of the front cowl 21. Further, as shown in FIG. 13, a cushioning member 36 formed from, for example, rubber is interposed between the bracket 2d and the edge portion 21c of the front cowl 21. The cushioning member 36 has a projection 36a for preventing the relative movements of the cushioning member 36 and the bracket 2d. The projection 36a is fitted into a hole 2f formed in the bracket 2d. Also, the cushioning member 36 is provided with holes 36b and 36 through which the bolts 44 and 44 are inserted. The edges of the holes 36b and 36 rise in a direction in which the bolts 44 and 44 are extended. Cylindrical-shaped collars 37 and 37 are arranged inside the holes 36b and 36b, and the bolts 44 and 44 are inserted through the collars 37 and 37. In addition, bolt covers 46 are fitted onto heads of the bolts 44 to close holes (for example, hexagonal holes) formed on the heads of the bolts 44.

The side mirrors 40R and 40L described above includes the mount seat 41 mounted to the front cowl 21 that covers the front of the vehicle body, the mirror stay 42 supported by the mount seat 41 so that the base 42a can turn, and the mirror 43 provided at the tip end of the mirror stay 42. The mount seat 41 includes the base portion 41a extended in one direction and mounted to the front cowl 21. Also, the mount seat 41 includes the support portion 41b on the base portion 41a and the support portion 41b supports the base 42a of the mirror stay 42 so that the direction Dp in which the turning shaft of the mirror stay 42 extends is inclined to the length direction DL of the base portion 41a.

With the side mirrors 40R and 40L, that direction Dp in which the turning shaft 42b of the mirror stay 42 extends is not constrained with respect to the length direction DL of the base portion 41a, so that it is possible to increase the degree of freedom in selecting a mount position of the mount seat 41.

With the side mirrors 40R and 40L, the base portion 41a is mounted in a position deviated toward one side (right or left) relative to the center in the vehicle width direction and the turning shaft 42b extends obliquely downward from the position P1 deviated toward the vehicle width center portion toward the position P2 deviated outwardly of the vehicle width center portion. Thereby, by moving the mirror stay 42 rearward, the mirror 43 provided at the end thereof is moved centrally in the vehicle width direction, thus enabling a decreased vehicle width.

Also, with the side mirrors 40R and 40L, the base portion 41a is mounted in a position deviated toward one side relative to the center in the vehicle width direction so that the length direction DL thereof is oriented substantially in a longitudinal direction of the vehicle body in top view. The turning shaft 42b extends from a position P1 deviated toward the vehicle widthwise center side and forwardly of the length direction DL of the base portion 41a to a position P2 deviated outwardly of the vehicle width direction and rearwardly of the length direction DL. Thereby, in the case where the mirror stay 42 is folded toward the rear of the vehicle body, it is easy to position the mirror 43 toward the vehicle width center direction.

Also, the base portion 41a is provided with two mount holes 41d and 41d aligned in the length direction DL of the base portion 41a for fixing the mount seat 41 to the front cowl 21. The support portion 41b is provided between the mount holes 41d and 41d. Thereby, the side mirrors 40R and 40L can be further assuredly supported by the mount seats 41.

Also, the motorcycle 1 includes the rectifier plate 30 forwardly of the front cowl 21 to rectify a travel wind directed toward the vehicle body. The support portion 41b of the mount seat 41 supports the base 42a of the mirror stay 42 so as to avoid the interference between the mirror stay 42 and the rectifier plate 30. Thereby, even in the case where the motorcycle 1 is provided with the rectifier plate 30, it is possible to smoothly move the mirror stay 42.

It should be noted that the present invention is not limited to the side mirrors 40R and 40L described above, but allows various modifications. For example, in the aforementioned embodiment, as shown in FIG. 14, in explaining the direction Dp in which the turning shaft 42b extends, the position P1 deviated toward the vehicle width center portion is located rearwardly of the straight line Lw passing through the center of the turning shaft 42b in the vehicle width direction and the position P2 is located forwardly of the straight line Lw. However, that direction Dp in which the turning shaft 42b extends can be further inclined so that the position P1 is disposed forwardly of the straight line Lw and the position P2 is disposed rearwardly of the straight line Lw. Thereby, in the case where the mirror stay 42 is folded rearward, it is easier to position the mirror 43 toward the center in the vehicle width direction (see FIG. 10).

BROAD SCOPE OF THE INVENTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as an non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A vehicle comprising:
   a side mirror including:
      a mount seat mounted to a front cowl arranged to cover a portion of a front of a vehicle body;
      a mirror stay including a basal end supported by the mount seat in a turnable manner; and
      a mirror provided at a tip end of the mirror stay; wherein
      the mount seat includes a base portion extending in one direction and mounted to the front cowl, and a support portion provided on the base portion and arranged to support the basal end of the mirror stay so that a direction in which a turning shaft of the mirror stay extends is inclined with respect to a length direction of the base portion; and
   a rectifier plate arranged to rectify a travel wind directed toward the vehicle body is provided forwardly of the front cowl; and
   the support portion supports the basal end of the mirror stay so as to avoid an interference between the mirror stay and the rectifier plate.

2. The vehicle as recited in claim 1, wherein the base portion is mounted in a position deviated outwardly of a vehicle widthwise center portion, and the turning shaft extends obliquely downward from a position deviated toward the vehicle widthwise center portion toward a position deviated outwardly of the vehicle widthwise center portion.

3. The vehicle as recited in claim 2, wherein the base portion is mounted in a position deviated outwardly of the vehicle widthwise center portion with the length direction of the base portion oriented in a substantially longitudinal direction of the vehicle body as viewed in top view, and the turning shaft extends from a position deviated toward the vehicle widthwise center portion and forwardly of the length direction of the base portion toward a position deviated outwardly of the vehicle widthwise center portion and rearwardly of the length direction of the base portion.

4. The vehicle as recited in claim 1, wherein the base portion is mounted in a position deviated outwardly of a vehicle widthwise center portion with the length direction of the base portion oriented in a substantially longitudinal direction of the vehicle body as viewed in top view, and the turning shaft extends from a position deviated toward the vehicle widthwise center portion and forwardly of the length direction of the base portion toward a position deviated outwardly of the vehicle widthwise center portion and rearwardly of the length direction of the base portion.

5. The vehicle as recited in claim 1, wherein the base portion is provided with at least two mount portions arranged in the length direction of the base portion to fix the mount seat to the front cowl, and the support portion is provided between the two mount portions.

6. The vehicle as recited in claim 1, wherein the basal end of the mirror stay is turnably supported by the mount seat in such a manner that the mirror stay is capable of selectively taking one of positions including a use position, a forwardly folded position, and a rearwardly folded position.

7. The vehicle as recited in claim 6, wherein, in the forwardly folded position, the tip end of the mirror is positioned inwardly of an edge of the front cowl in a vehicle width direction, and, in the rearwardly folded position, an end of the mirror located outward in the vehicle width direction is positioned inwardly of an end of a grip of a handle of the vehicle.

8. The vehicle as recited in claim 1, wherein the vehicle is a motorcycle.

* * * * *